United States Patent
Fei et al.

(10) Patent No.: US 11,573,442 B2
(45) Date of Patent: Feb. 7, 2023

(54) MODULE STRUCTURE OF LIQUID CRYSTAL DISPLAY AND MANUFACTURING PROCESS OF MODULE STRUCTURE

(71) Applicant: Schneider Electric Industries SAS, Rueil-Malmaison (FR)

(72) Inventors: Weihe Fei, Shanghai (CN); Zhaocai Wang, Shenzhen (CN)

(73) Assignee: Schneider Electric Industries SAS, Rueil-Malmaison (FR)

( * ) Notice: Subject to any disclaimer, the term of this patent is extended or adjusted under 35 U.S.C. 154(b) by 0 days.

(21) Appl. No.: 17/371,365

(22) Filed: Jul. 9, 2021

(65) Prior Publication Data
US 2022/0011622 A1 Jan. 13, 2022

(30) Foreign Application Priority Data
Jul. 10, 2020 (CN) .......................... 202010661089.1

(51) Int. Cl.
*G02F 1/1333* (2006.01)
*B32B 37/12* (2006.01)

(52) U.S. Cl.
CPC ........ *G02F 1/133311* (2021.01); *B32B 37/12* (2013.01); *G02F 1/133331* (2021.01);
(Continued)

(58) Field of Classification Search
None
See application file for complete search history.

(56) References Cited

U.S. PATENT DOCUMENTS

2010/0208188 A1* 8/2010 Tsai ................... H01L 51/5246
257/E27.111
2011/0187956 A1 8/2011 Kim et al.
(Continued)

FOREIGN PATENT DOCUMENTS

CN 1821843 A * 8/2006
KR 1020130033585 A 4/2013

OTHER PUBLICATIONS

Extended European Search Report dated Nov. 23, 2021 for corresponding European Patent Application No. 21305947.0—1210, 8 pages.

*Primary Examiner* — Phu Vu
(74) *Attorney, Agent, or Firm* — Locke Lord LLP (57) ABSTRACT

The present disclosure relates to a module structure of a liquid crystal display, the module structure includes a panel glass assembly, a backlight assembly and a display housing retaining wall; an accommodating space formed by the display housing retaining wall accommodates the panel glass assembly and the backlight assembly; the panel glass assembly includes a front glass sheet, a rear glass sheet and a sealant for sealing a liquid crystal accommodating space between the front glass sheet and the rear glass sheet. The module structure is characterized in that, a filling gap is provided between outer peripheral surfaces of the front glass sheet and the rear glass sheet of the panel glass assembly and an inner peripheral surface of the display housing retaining wall facing the outer peripheral surfaces; and a panel edge protective adhesive is filled in the filling gap. The present disclosure also relates to a manufacturing process of the module structure.

15 Claims, 4 Drawing Sheets

(52) U.S. Cl.
CPC ............... *B32B 2037/1253* (2013.01); *B32B 2307/7265* (2013.01); *B32B 2457/202* (2013.01); *G02F 2202/28* (2013.01)

(56) References Cited

U.S. PATENT DOCUMENTS

| | | | |
|---|---|---|---|
| 2013/0293804 A1* | 11/2013 | Kim | G02F 1/133308 |
| | | | 349/58 |
| 2016/0116817 A1* | 4/2016 | Wu | G02F 1/16753 |
| | | | 359/296 |
| 2017/0184912 A1 | 6/2017 | Ochi et al. | |
| 2017/0336694 A1 | 11/2017 | Wu et al. | |
| 2018/0143487 A1* | 5/2018 | Chen | G02F 1/133512 |

\* cited by examiner

MODULE STRUCTURE OF LIQUID CRYSTAL DISPLAY AND MANUFACTURING PROCESS OF MODULE STRUCTURE

TECHNICAL FIELD

The present disclosure relates to a module structure of a liquid crystal display. The present disclosure also relates to a manufacturing process of the module structure.

BACKGROUND

Liquid crystal displays (LCDs) have been widely used in industrial control man-machine interface products. Due to the harsh usage environment of industrial control products, the service life for continuous operation of an equipment and the quality assurance for high-reliability operation of the equipment, users' requirements of reliability on industrial displays have been considerably increased as compared to consumer products. Especially, for power distribution products, they are usually installed in natural environments with high temperature and humidity as well as wide temperature range, and people have extremely high requirements on the continuity of power supply. Therefore, stricter requirements are raised from users on the reliability of displays used in power distribution products. In order to meet the high reliability requirements on the displays of products for special industrial application, it is necessary to propose a designing method and a manufacturing process of LCD modules with high reliability requirements.

Figure 1:
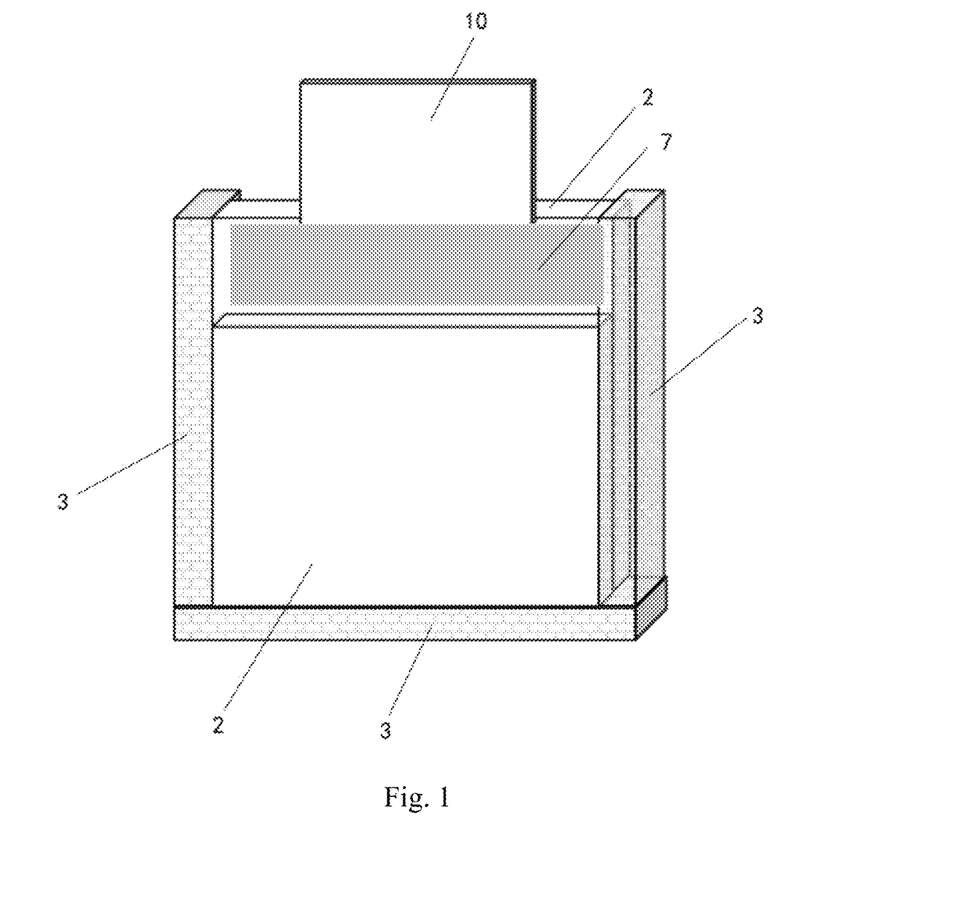
FIG. 1 shows a schematic diagram of a module structure of a liquid crystal display in the prior art.

Common failure modes of a LCD include disconnection, black spot, no display and the like. The failure mechanism of disconnection and no display is that, a wiring on a LCD panel is broken due to electrochemical corrosion, while the failure mechanism of black spot is that, a sealing performance of a sealant around the LCD panel is invalid, which results in a leakage of liquid crystal inside the display panel or causes ambient water vapor to penetrate into the display panel. In order to avoid an occurrence of these failure mechanisms, the existing technical solution usually is to coat a terminal part protective adhesive on a lead terminal of the LCD, and at the same time, a module housing (or backlight) retaining wall is designed around the display panel to avoid a contact with a human hand or prevent foreign matters from entering a gap between an upper glass sheet and a lower glass sheet of the panel. Moreover, in the design of the display panel, a high-reliability panel sealant and measures for increasing a width of the panel sealant can be adopted depending on the customer's reliability requirements. FIG. 1 is a structural diagram of an existing module structure of LCD, which is characterized in that a terminal part attached to a LCD controller is coated with a terminal part protective adhesive. At the same time, a module housing retaining wall is provided around the LCD panel, and the LCD panel is closely attached onto the module housing retaining wall to prevent foreign matters from entering the a gap of the panel.

However, these solutions can only meet the reliability requirements of general industrial displays. When designing display panels, the selection of panel sealant is determined according to the preset reliability requirements. Once the design is finalized, users can no longer request panel manufacturers to change the design. Therefore, if it attempts to further improve the reliability of the display and meet the requirements of high reliability and long-term operation in harsh industrial environments, improved protective measures have to be adopted in module design.

SUMMARY

A display module is generally composed of a LCD panel, a liquid crystal controller, a flexible printed circuit board (FPC) and a housing assembly. According to the general concept of the present disclosure, in order to prevent ambient water vapor from penetrating into a liquid crystal box of the display panel, a grooved gap is designed between a panel edge and a retaining wall of housing (or backlight source), and a protective adhesive with excellent waterproof and airtightness performance such as UV adhesive (RTV adhesive, epoxy resin adhesive) is filled in the grooved gap. Moreover, the commonly used terminal part protective adhesive of the display is subjected to a stricter treatment for strengthening the waterproof and sealing performance, for example, increasing a coating thickness of the terminal part protective adhesive so that the terminal part protective adhesive flows over an upper surface of a front glass sheet of the panel and completely covers an edge of the front glass sheet, or coating another adhesive with waterproof function on the terminal part protective adhesive so as to completely cover the edge of the front glass sheet of the panel.

Specifically, according to one aspect of the present disclosure, a module structure of a liquid crystal display is provided, which includes a panel glass assembly, a backlight assembly and a display housing retaining wall.

An accommodating space formed by the display housing retaining wall accommodates the panel glass assembly and the backlight assembly.

The panel glass assembly includes a front glass sheet, a rear glass sheet and a sealant for sealing a liquid crystal accommodating space between the front glass sheet and the rear glass sheet.

A filling gap is provided between outer peripheral surfaces of the front glass sheet and the rear glass sheet of the panel glass assembly and an inner peripheral surface of the display housing retaining wall facing the outer peripheral surfaces.

A panel edge protective adhesive is filled in the filling gap.

According to the above aspect of the present disclosure, a liquid crystal display controller is provided on the terminal part of the rear glass sheet.

A terminal part protective adhesive is coated on the terminal part, so that the terminal part protective adhesive completely covers the liquid crystal display controller and a height of the terminal part protective adhesive is equal to or greater than that of an upper surface of the front glass sheet.

According to the above aspects of the disclosure, the terminal part protective adhesive is further coated on the terminal part, so that the terminal part protective adhesive flows over the upper surface of the front glass sheet and so that the terminal part protective adhesive completely covers the edge of the front glass sheet.

According to the above aspects of the present disclosure, a waterproof adhesive is coated on the terminal part protective adhesive so that the waterproof adhesive covers the edge of the front glass sheet.

According to the above aspects of the present disclosure, an elastic buffering sheet is provided between the backlight assembly and the rear glass sheet and is attached along a periphery of the rear glass sheet. The elastic buffering sheet is configured to prevent a panel edge protection adhesive from penetrating into a display area during a subsequent injection process of the panel edge protection adhesive.

According to the above aspects of the present disclosure, a size of the filling gap is equal to or greater than 0.5 mm.

According to the above aspects of the present disclosure, the panel edge protection adhesive is an ultraviolet curable adhesive. The panel edge protective adhesive is configured to strengthen a sealing performance of the sealant, which not only prevents a leakage of liquid crystal, but also prevents an infiltration of ambient water vapor into the sealant, thereby prolonging a service life of the liquid crystal display.

According to the above aspects of the present disclosure, the terminal part protective adhesive is a room temperature vulcanized silicone rubber or an ultraviolet curable adhesive.

According to another aspect of the present disclosure, a manufacturing process of a module structure of a liquid crystal display is proposed, the module structure includes a panel glass assembly, a backlight assembly and a display housing retaining wall.

An accommodating space formed by the display housing retaining wall accommodates the panel glass assembly and the backlight assembly.

The panel glass assembly includes a front glass sheet, a rear glass sheet and a sealant for sealing a liquid crystal accommodating space between the front glass sheet and the rear glass sheet.

The manufacturing process includes a module designing stage.

In the module designing stage, a filling gap is designed in advance between outer peripheral surfaces of the front sheet glass and the rear sheet glass of the panel glass assembly and an inner peripheral surface of the display housing retaining wall facing the outer peripheral surfaces.

According to the above another aspect of the present disclosure, the manufacturing process further includes an attaching stage.

In the attaching stage, attaching a flexible circuit board onto the rear glass sheet firstly.

Then coating a terminal part protective adhesive on a terminal part of the rear glass sheet, so that a height of the terminal part protective adhesive is equal to or greater than that of an upper surface of the front glass sheet.

According to the above another aspect of the present disclosure, the manufacturing process further comprises a module assembling stage.

An elastic buffering sheet is provided between the backlight assembly and the rear glass sheet and is attached along a periphery of the rear glass sheet. The elastic buffering sheet is configured to prevent a panel edge protection adhesive from penetrating into a display area during a subsequent injection process of the panel edge protection adhesive.

The panel glass assembly is attached in the display housing retaining wall.

A panel edge protective adhesive is filled in the filling gap.

The filled panel edge protective adhesive is cured with ultraviolet irradiation.

The panel edge protective adhesive is configured to strengthen a sealing performance of the sealant, which not only prevents a leakage of liquid crystal, but also prevents an infiltration of ambient water vapor into the sealant, thereby prolonging a service life of the liquid crystal display.

According to another aspect of the present disclosure, the terminal part protective adhesive is further coated on the terminal part, so that the terminal part protective adhesive flows over the upper surface of the front glass sheet and so that the terminal part protective adhesive completely covers the edge of the front glass sheet.

According to another aspect of the present disclosure, a waterproof adhesive is coated on the terminal part protective adhesive so that the waterproof adhesive covers the edge of the front glass sheet.

According to the above another aspect of the present disclosure, the filling gap is designed to have a size equal to or greater than 0.5 mm.

According to the above another aspect of the present disclosure, an ultraviolet curable adhesive is selected as the panel edge protective adhesive.

According to the above another aspect of the disclosure, a room temperature vulcanized silicone rubber or an ultraviolet curable adhesive is selected as the terminal part protective adhesive.

According to the present disclosure, a design suitable for a high-reliability industrial display module is provided, so that the display can be used in harsh environments, such as power distribution products used in high-temperature and high-humidity environments.

So far, in order that the detailed description of this disclosure can be better understood and the contribution of the present disclosure to the prior art can be better recognized, the present disclosure has summarized the contents of the present disclosure quite broadly. Of course, embodiments of the present disclosure will be described below and will form the subject matters of the appended claims.

Likewise, those skilled in the art will recognize that the concepts on which the present disclosure is based can be easily used as a basis for designing other structures, methods and systems for carrying out several purposes of the present disclosure. Therefore, it is important that the appended claims should be considered to include such equivalent structures as long as they do not go beyond the spirit and scope of the present disclosure.

BRIEF DESCRIPTION OF THE DRAWINGS

From the following drawings, those skilled in the art will have a better understanding of the present disclosure, and the advantages of the present disclosure can be more clearly reflected. The drawings described herein are only for illustrative purposes of selected embodiments but not all possible implementations, and are not intended to limit the scope of the present disclosure.

DETAILED DESCRIPTION

FIG. 1 is a schematic diagram of a module structure of a liquid crystal display in the prior art, which is characterized in that, a terminal part of a controller bonded to the liquid crystal display is coated with a terminal part protective adhesive 7. At the same time, a display housing retaining wall 3 is provided around a panel glass assembly 2 (including a front glass sheet and a rear glass sheet) of the liquid crystal display, and the panel glass assembly 2 is closely attached onto the display housing retaining wall 3 to prevent foreign matters from entering a panel gap.

Figure 2:
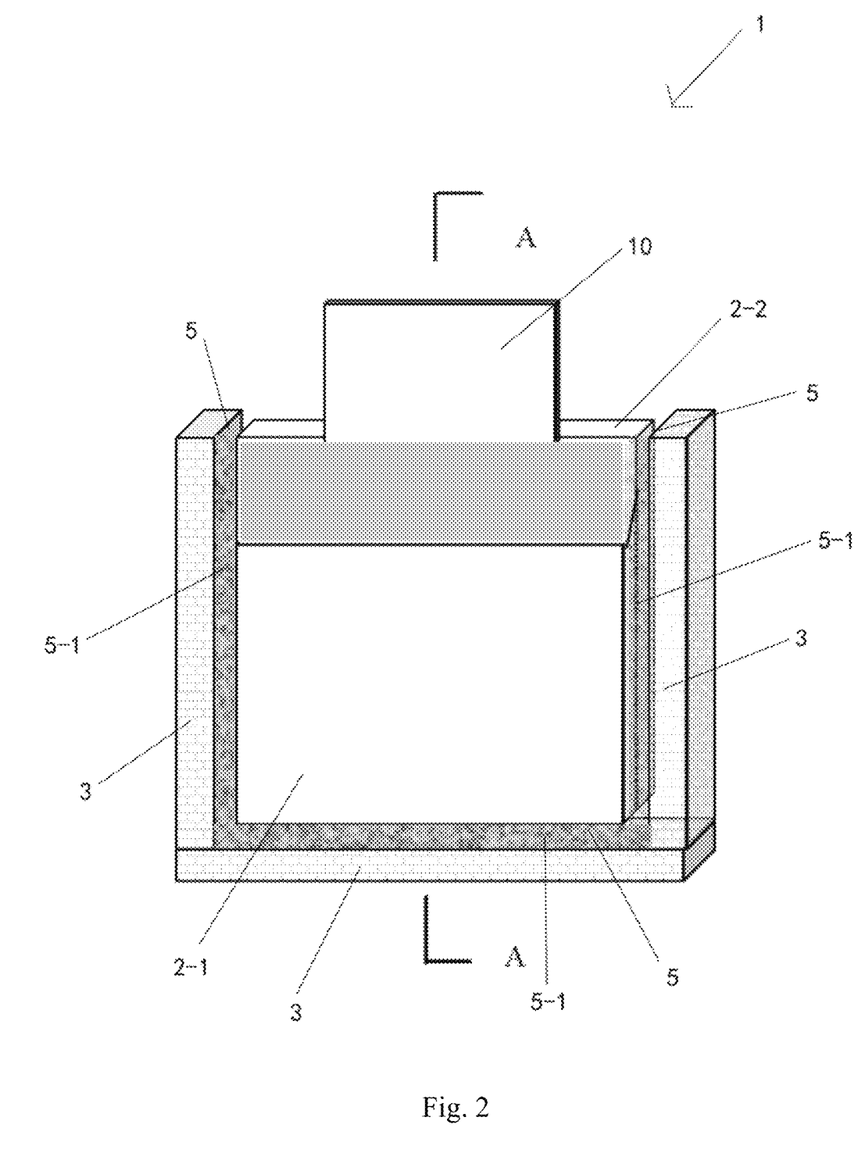
FIG. 2 shows a schematic diagram of a module structure of a liquid crystal display according to the present disclosure.
Figure 3:
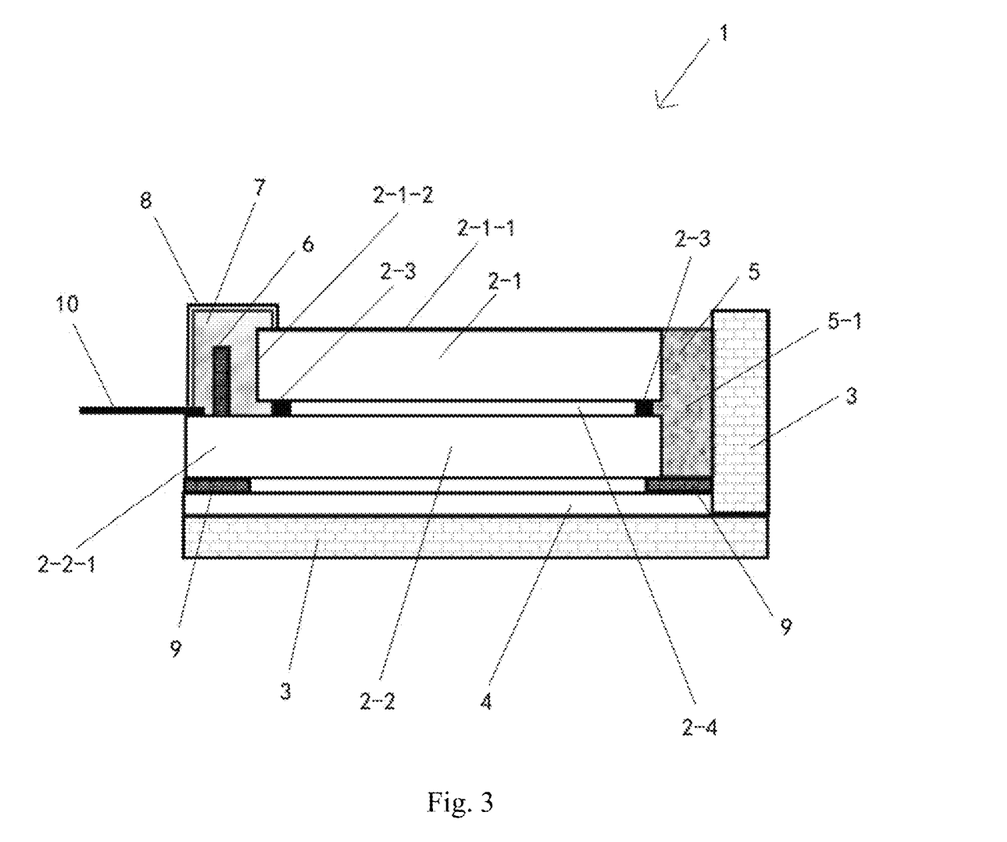
FIG. 3 shows a sectional view of a module structure of a liquid crystal display according to the present disclosure along A-A in FIG. 2.
Figure 4:
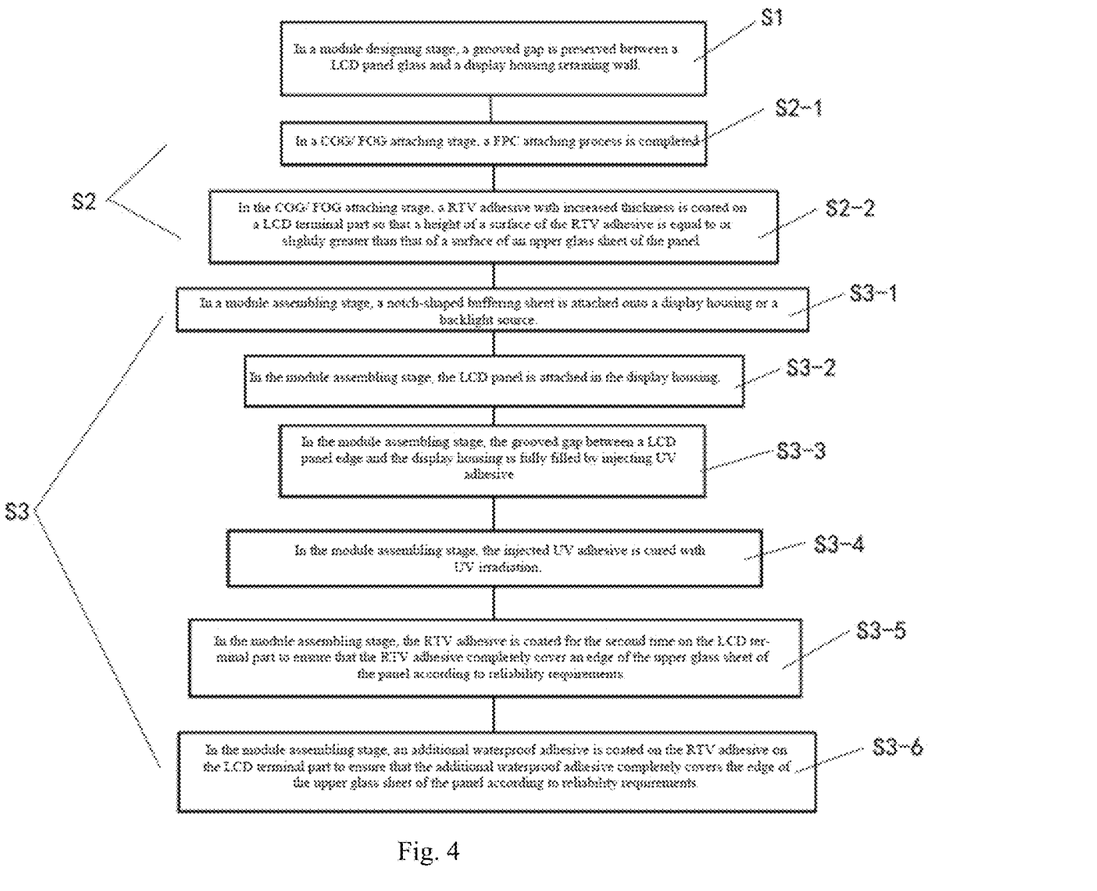
FIG. 4 shows a manufacturing process of a module structure of a liquid crystal display according to the present disclosure.

With reference to FIGS. 2 to 4, specific embodiments according to the present disclosure will be described in detail below.

According to an embodiment of the present disclosure, a module structure 1 of a liquid crystal display is provided. The module structure 1 includes a panel glass assembly 2, a backlight assembly 4 and a display housing retaining wall 3.

An accommodating space formed by the display housing retaining wall 3 accommodates the panel glass assembly 2 and the backlight assembly 4.

As shown in FIG. 2, the panel glass assembly 2 includes a front glass sheet 2-1, a rear glass sheet 2-2, and a sealant 2-3 for sealing a liquid crystal accommodating space 2-4 between the front glass sheet 2-1 and the rear glass sheet 2-2.

A filling gap 5 is provided between outer peripheral surfaces of the front glass sheet 2-1 and the rear glass sheet 2-2 of the panel glass assembly 2 and an inner peripheral surface of the display housing retaining wall 3 facing the outer peripheral surfaces.

The filling gap 5 is filled with a panel edge protective adhesive 5-1.

According to the above embodiment of the present disclosure, a liquid crystal display controller 6 is provided on a terminal part 2-2-1 of the rear glass sheet 2-2.

A terminal part protective adhesive 7 is coated on the terminal part 2-2-1, so that the terminal part protective adhesive 7 completely covers the liquid crystal display controller 6 and so that a height of the terminal part protective adhesive 7 is equal to or higher than that of an upper surface 2-1-1 of the front glass sheet 2-1.

According to the above embodiments of the present disclosure, the terminal part protective adhesive 7 is further coated on the terminal part 2-2-1, so that the terminal part protective adhesive 7 flows over the upper surface 2-1-1 of the front glass sheet 2-1, so that the terminal part protective adhesive 7 completely covers an edge 2-1-2 of the front glass sheet 2-1.

According to the above embodiments of the present disclosure, as shown in FIG. 3, a waterproof adhesive 8 is coated on the terminal part protective adhesive 7 so that the waterproof adhesive 8 covers the edge 2-1-2 of the front glass sheet 2-1.

According to the above embodiments of the present disclosure, an elastic buffering sheet 9 is provided between the backlight assembly 4 and the rear glass sheet 2-2 and attached along a periphery of the rear glass sheet 2-2. The elastic buffering sheet 9 serves to prevent a panel edge protective adhesive 5-1 from penetrating into a display area during a subsequent injection process of the panel edge protective adhesive 5-1.

According to the above embodiments of the present disclosure, a size of the filling gap 5 is equal to or greater than 0.5 mm.

According to the above embodiments of the present disclosure, the panel edge protection adhesive 5-1 is an ultraviolet curable adhesive. The panel edge protective adhesive 5-1 plays a role in strengthening a sealing performance of the sealant 2-3, which not only prevents from a leakage of liquid crystal but also prevents ambient water vapor from penetrating into the sealant 2-3, thereby prolonging a service life of the liquid crystal display.

According to the above embodiments of the present disclosure, the terminal part protective adhesive 7 is a room temperature vulcanized silicone rubber or an ultraviolet curable adhesive.

According to another embodiment of the present disclosure, as shown in FIG. 4, a manufacturing process of a module structure of a liquid crystal display is provided. It should be noted that the manufacturing process in FIG. 4 is not unique, and an engineering designer can adjust, trim, merge and supplement the manufacturing process according to specific characteristics of a LCD panel and specific conditions of production lines.

As shown in FIGS. 2 and 3, the module structure 1 includes a panel glass assembly 2, a backlight assembly 4 and a display housing retaining wall 3.

An accommodating space formed by the display housing retaining wall 3 accommodates the panel glass assembly 2 and the backlight assembly 4.

The panel glass assembly 2 includes a front glass sheet 2-1, a rear glass sheet 2-2, and a sealant 2-3 for sealing a liquid crystal accommodating space between the front glass sheet 2-1 and the rear glass sheet 2-2.

The manufacturing process includes a module designing stage S1.

In the module designing stage S1, designing a filling gap 5, in advance, between outer peripheral surfaces of the front glass sheet 2-1 and the rear glass sheet 2-2 of the panel glass assembly 2 and an inner peripheral surface of the display housing retaining wall 3 facing the outer peripheral surfaces.

According to another embodiment of the present disclosure, the manufacturing process further includes an attaching stage S2.

In the attaching stage S2, a flexible circuit board 10 is attached onto the rear glass sheet 2-2 firstly (S2-1).

Then, a terminal part protective adhesive 7 is coated on the terminal part 2-2-1 of the rear glass sheet 2-2, so that a height of the terminal part protective adhesive 7 is equal to or greater than that of an upper surface 2-1-1 of the front glass sheet 2-1 (S2-2).

According to another embodiment of the present disclosure, the manufacturing process further includes a module assembling stage S3.

In the module assembling stage S3, an elastic buffering sheet 9 is provided between the backlight assembly 4 and the rear glass sheet 2-2 and the elastic buffering sheet 9 is attached along a periphery of the rear glass sheet 2-2. The elastic buffering sheet 9 serves to prevent a panel edge protective adhesive 5-1 from penetrating into a display area in a subsequent injection process of the panel edge protective adhesive 5-1 (S3-1).

The panel glass assembly 2 is attached in the display housing retaining wall 3 (S3-2).

A panel edge protective adhesive 5-1 is filled in the filling gap 5 (S3-3).

The filled panel edge protective adhesive 5-1 is cured with ultraviolet irradiation (S3-4).

The panel edge protective adhesive 5-1 plays a role in strengthening a sealing performance of the sealant 2-3, which not only prevents from a leakage of liquid crystal but also prevents ambient water vapor from penetrating into the sealant 2-3, thereby prolonging a service life of the liquid crystal display.

According to another embodiment of the present disclosure, a terminal part protective adhesive 7 is further coated on the terminal part 2-2-1, so that the terminal part protective adhesive 7 flows over an upper surface 2-1-1 of the front glass sheet 2-1 and so that the terminal part protective adhesive 7 completely covers an edge 2-1-2 of the front glass sheet 2-1 (S3-5).

According to another embodiment of the present disclosure, a waterproof adhesive 8 is coated on the terminal part protective adhesive 7 so that the waterproof adhesive 8 covers the edge 2-1-2 of the front glass sheet 2-1 (S3-6).

According to the above another embodiment of the present disclosure, the filling gap 5 is designed to have a size equal to or greater than 0.5 mm.

According to the above another embodiment of the present disclosure, an ultraviolet curable adhesive is selected as the panel edge protective adhesive 5-1.

According to the above another embodiment of the present disclosure, a room temperature vulcanized silicone rubber or an ultraviolet curable adhesive is selected as the terminal part protective adhesive 7.

Although the present disclosure has been described in the specification and drawings with reference to specific embodiments, it should be understood that various changes can be made by those skilled in the art without departing from the scope of the present disclosure as defined in the claims, and various equivalents can be substituted for various elements therein. Furthermore, the combination and collocation of technical features, elements and/or functions among specific embodiments in the present disclosure are definite and clear, from which those skilled in the art can appreciate that the technical features, elements and/or functions of an embodiment can be combined into another specific embodiment as appropriate, unless otherwise described above. In addition, according to the teaching of the present disclosure, many changes can be made to adapt to special situations or materials without departing from the scope of the essence of the present disclosure. Therefore, the present disclosure is not limited to the specific embodiments illustrated in the drawings or the specific embodiments described in the specification as the best mode presently contemplated for carrying out the present disclosure, but the present disclosure is intended to include all embodiments falling within the scope of the above description and the appended claims.

What is claimed is:

1. A module structure of a liquid crystal display, the module structure comprising a panel glass assembly, a backlight assembly and a display housing retaining wall;
    an accommodating space formed by the display housing retaining wall accommodating the panel glass assembly and the backlight assembly;
    the panel glass assembly comprising a front glass sheet, a rear glass sheet and a sealant for sealing a liquid crystal accommodating space between the front glass sheet and the rear glass sheet,
    wherein:
    a filling gap is provided between outer peripheral surfaces of the front glass sheet and the rear glass sheet of the panel glass assembly and an inner peripheral surface of the display housing retaining wall facing the outer peripheral surfaces;
    an elastic buffering sheet is provided between the backlight assembly and the rear glass sheet, and is attached along a periphery of the rear glass sheet; and
    a panel edge protective adhesive is filled in the filling gap, and wherein:
    the elastic buffering sheet is configured to prevent the panel edge protective adhesive from penetrating into a display area when the panel edge protective adhesive is filled in the filling gap.

2. The module structure according to claim 1, wherein:
    a liquid crystal display controller is provided on a terminal part of the rear glass sheet; and
    a terminal part protective adhesive is coated on the terminal part, so that the terminal part protective adhesive completely covers the liquid crystal display controller and a height of the terminal part protective adhesive is equal to or greater than that of an upper surface of the front glass sheet.

3. The module structure according to claim 2, wherein:
    the terminal part protective adhesive is further coated on the terminal part, so that the terminal part protective adhesive flows over the upper surface of the front glass sheet and so that the terminal part protective adhesive completely covers an edge of the front glass sheet.

4. The module structure according to claim 3, wherein:
    a waterproof adhesive is coated on the terminal part protective adhesive so that the waterproof adhesive covers an edge of the front glass sheet.

5. The module structure according to claim 1, wherein:
    a size of the filling gap is equal to or greater than 0.5 mm.

6. The module structure according to claim 1, wherein:
    the panel edge protective adhesive is an ultraviolet curable adhesive.

7. The module structure according to claim 3, wherein:
    the terminal part protective adhesive is a room temperature vulcanized silicone rubber or an ultraviolet curable adhesive.

8. A manufacturing process of a module structure of a liquid crystal display, the module structure comprising a panel glass assembly, a backlight assembly and a display housing retaining wall;
    an accommodating space formed by the display housing retaining wall accommodating the panel glass assembly and the backlight assembly;
    the panel glass assembly comprising a front glass sheet, a rear glass sheet and a sealant for sealing a liquid crystal accommodating space between the front glass sheet and the rear glass sheet,
    wherein:
    the manufacturing process comprises a module designing stage;
    in the module designing stage, a filling gap is designed in advance between outer peripheral surfaces of the front glass sheet and the rear glass sheet of the panel glass assembly and an inner peripheral surface of the display housing retaining wall facing the outer peripheral surfaces; and
    the manufacturing process further comprises a module assembling stage;
    in the module assembling stage, an elastic buffering sheet is provided between the backlight assembly and the rear glass sheet and is attached along a periphery of the rear glass sheet; and
    a panel edge protective adhesive is filled in the filling gap, wherein the elastic buffering sheet is configured to prevent the panel edge protective adhesive from penetrating into a display area when the panel edge protective adhesive is filled in the filling gap.

9. The manufacturing process according to claim 8, wherein:
    the manufacturing process further comprises an attaching stage;
    in the attaching stage, a flexible circuit board is attached onto the rear glass sheet firstly;
    a terminal part protective adhesive is then coated on a terminal part of the rear glass sheet, so that a height of the terminal part protective adhesive is equal to or greater than that of an upper surface of the front glass sheet.

10. The manufacturing process according to claim 9, wherein:
in the module assembling stage,
the panel glass assembly is attached in the display housing retaining wall; and
the filled, panel edge protective adhesive is cured with ultraviolet radiation.

11. The manufacturing process according to claim 10, wherein:
the terminal part protective adhesive is further coated on the terminal part, so that the terminal part protective adhesive flows over the upper surface of the front glass sheet and so that the terminal part protective adhesive completely covers an edge of the front glass sheet.

12. The manufacturing process according to claim 11, wherein:
a waterproof adhesive is coated on the terminal part protective adhesive so that the waterproof adhesive covers the edge of the front glass sheet.

13. The manufacturing process according to claim 8, wherein:
the filling gap is designed to have a size equal to or greater than 0.5 mm.

14. The manufacturing process according to claim 10, wherein:
an ultraviolet curable adhesive is selected as the panel edge protective adhesive.

15. The manufacturing process according to claim 9, wherein:
a room temperature vulcanized silicone rubber or an ultraviolet curable adhesive is selected as the terminal part protective adhesive.

* * * * *